Nov. 19, 1935. T. G. MELISH 2,021,800
CORN POPPER
Filed Dec. 16, 1933
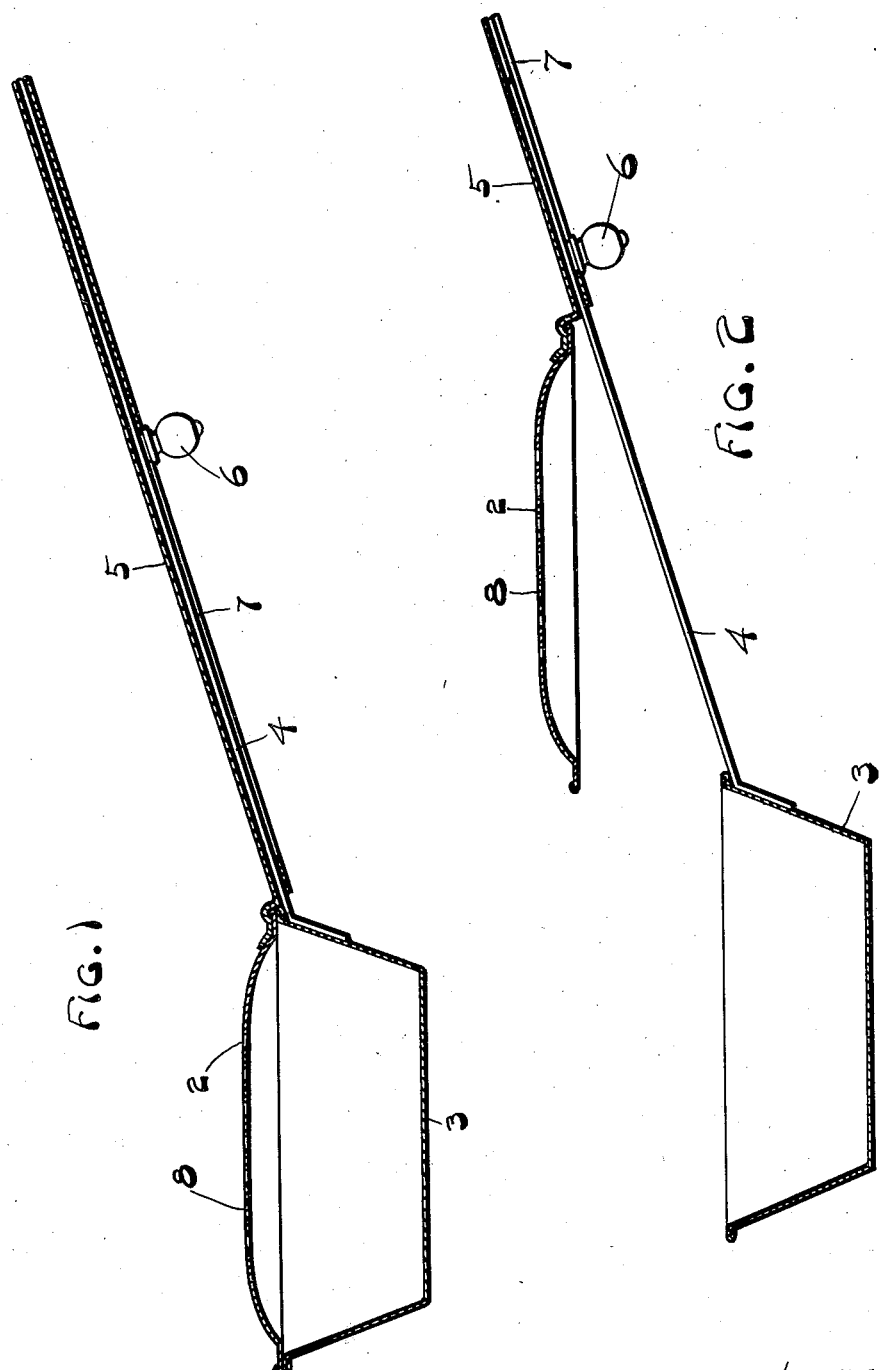

Patented Nov. 19, 1935

2,021,800

UNITED STATES PATENT OFFICE 2,021,800

CORN POPPER

Thomas G. Melish, Cincinnati, Ohio, assignor to The Bromwell Wire Goods Company, Cincinnati, Ohio, a corporation of Delaware Application December 16, 1933, Serial No. 702,759

1 Claim. (Cl. 53—4)

An object of the invention herein described is to produce a popper for corn, which is materially improved in its functions, over other poppers known to me, in that it permits of the ready removal of hulls, unpopped kernels and dirt particles from the popped corn immediately upon completion of the popping operation and before access to the popped corn is had, thereby causing the popped corn to be ready for use immediately upon opening the popper, and, further, to produce such a popper as will overcome an objection to other poppers known to me in that it permits of the opening and closing of the popper with materially less liability to the operator receiving burns than with other poppers known to me.

These and other objects are attained in the corn popper described in the following specification and illustrated in the accompanying drawing, in which:

Fig. 1 is a sectional elevation of the corn popper embodying my invention, showing the popper elements occupying a closed relationship to each other.

Fig. 2 is a view of the popper shown in Fig. 1, but showing the popper open and ready to receive corn to be popped.

The popper embodying my invention comprises essentially three elements, namely, a pan or receptacle 3, a cover 2, and a handle which consists of two portions, one portion 4 being attached to the pan 3 in any suitable manner, and in a position such as suggested in Fig. 2, the cooperating portion 5 of the handle occupying a substantially embracing relationship to portion 4 so as to permit of motions of the handle portions relatively to each other, as suggested by the two views in the drawing. Portion 5 of the handle preferably constitutes the part which is grasped in holding the popper while it is being manipulated, while portion 4 is provided with a knob or extension 6 extending through an opening 7 in portion 5, for the purpose of sliding handle portion 4 outwardly relatively to portion 5, as shown in Fig. 2, whereby the pan 3 is removed from beyond the position of coverage afforded by cover or lid 2 of the popper. Preferably, although not absolutely essential to the functioning of the popper I have disclosed, I have caused the handle of the popper to occupy an inclined relationship to the general plane of the pan and cover. Because of this relationship I have created a condition in which, when the pan is moved away from the cover, the pan and cover not only are caused to occupy a non-coaxial relationship as shown in Fig. 2, but they are also separated vertically so as to cause the cover and pan to be materially spaced apart. This is a convenience both in the filling and emptying operations and also functions to separate the heated pan from the materially cooler cover or lid. Because of the attachment of knob 6 with handle portion 4 which carries pan 3, the operation of opening as well as closing the popper in no manner causes the hand of the operator to be brought closer to the pan at one time or another either in the act of covering or uncovering to render the contents accessible or to permit of the pan being filled. Also, because the knob 6 is located on the underside of portion 4, there can never be any possible contact of the operator's hand and fingers with the lid or cover, should it be possible that this element would ever become hot enough to be uncomfortable upon touching it inadvertently. Also, it will be observed that the hand which supports the popper at no time approaches one or the other of the elements 2 or 3, and, further, that in the act of opening the popper, the highly heated pan 3 is always caused to be moved at a greater distance from the operator's body, face, and supporting hand, than it occupied even when the popper was closed. In this manner there is avoided all possibility of burns and other discomforts associated with other corn poppers of the handled type known to me.

A minor item of my improved popper is that openings 8 of proper size in the cover, will permit of such foreign matter as dirt, hulls, unpopped kernels and the like to be removed after the popping operation has been completed, merely by reversing the closed popper and sifting such matter from the popped corn. This feature also affords desirable ventilation during the popping operation, as well as allowing inspection to be made of the condition within the popper during and upon completion of the popping operation.

Having thus described my invention what I claim is:

A corn popper comprising a pan, a cover, a rigid handle rigidly attached to the pan, a rigid handle rigidly attached to the cover, the handles extending at an angle upwardly from the pan and cover axis, having telescoping relationship and capable of correlative movement, whereby the pan may be covered and uncovered by bringing it into and out of coaxial and coplanar relationship with the cover.

THOMAS G. MELISH.